(12) United States Patent
Sheng et al.

(10) Patent No.: US 6,644,658 B2
(45) Date of Patent: Nov. 11, 2003

(54) OVERHANGING PAPER GUIDE FOR A SCANNER

(75) Inventors: Thomas Sheng, Hsinchu (TW); Chi-Yao Chen, Hsin-Chu (TW)

(73) Assignee: Avision Inc., Hsin-Chu (TW)

( * ) Notice: Subject to any disclaimer, the term of this patent is extended or adjusted under 35 U.S.C. 154(b) by 322 days.

(21) Appl. No.: 09/779,947

(22) Filed: Feb. 9, 2001

(65) Prior Publication Data

US 2002/0027321 A1 Mar. 7, 2002

(30) Foreign Application Priority Data

Sep. 7, 2000 (TW) ........................................ 89215697 U

(51) Int. Cl.7 ................................................ B65H 5/00
(52) U.S. Cl. ...................................................... 271/264
(58) Field of Search ........................ 271/264; 358/498; 399/215, 206, 365

(56) References Cited

U.S. PATENT DOCUMENTS 5,881,350 A * 3/1999 Wada et al. ............ 399/365 X
6,178,274 B1 * 1/2001 Youda et al. ........... 358/498 X
6,219,511 B1 * 4/2001 Okada ........................ 399/203

FOREIGN PATENT DOCUMENTS

TW 354209 12/1996

* cited by examiner

*Primary Examiner*—David H. Bollinger
(74) *Attorney, Agent, or Firm*—H. C. Lin

(57) ABSTRACT

The paper guide for a scanner has an upper guide and two lower guides: the inlet lower guide and the outlet lower guide. The inlet lower guide overhangs over an output lower guide and is separated by a gap in the direction of the paper movement. The paper is scanned at the gap by the scanning light.

1 Claim, 4 Drawing Sheets

OVERHANGING PAPER GUIDE FOR A SCANNER

BACKGROUND OF THE INVENTION (1) Field of the Invention

This invention relates to scanners, particularly to the paper guide of a scanner.

(2) Brief Description of the Related Art

FIG. 1 shows a prior art paper guide for a scanner. The paper guide is mounted over the scan window 24 of on top of the scanner frame 20. The paper guide has an upper guide 10, a lower paper inlet guide 11, a lower paper outlet guide 12, and a transparent film 23 between the inlet guide 11 and the outlet guide 12, as shown in FIG. 2. One end of the transparent film 23 connects to the lower surface of the outlet end 112 of the inlet guide 11, while the other end of the transparent film 23 connects to the upper surface of the inlet end 121 of the outlet guide 12. When a document P is fed from the lower paper inlet guide 11 past the transparent film 23, a light beam from the light source L is reflected by the paper as a beam 21 to sensitize an image sensor 22 for further signal processing. It can be seen that the lower guide includes three parts, the inlet paper lower guide 11, the transparent film 23, and the outlet paper lower guide 12. The transparent film 23 adds to the cost of a scanner, and is subject to rubbing during use, which may blur the film in time to obstruct the incident light.

SUMMARY OF THE INVENTION

An object of this invention is to reduce the cost of the paper guide of a scanner. Another object is to prevent the blurring of the transparent film of a scanner. Still another object is to optimize the amount of light incident on the document being scanned.

These objects are achieved by eliminating the transparent film. The inlet lower guide overhangs over the outlet lower guide. When the document is transported past the gap between the two lower guides, the document is read.

DETAILED DESCRIPTION OF THE INVENTION

Figure 1:
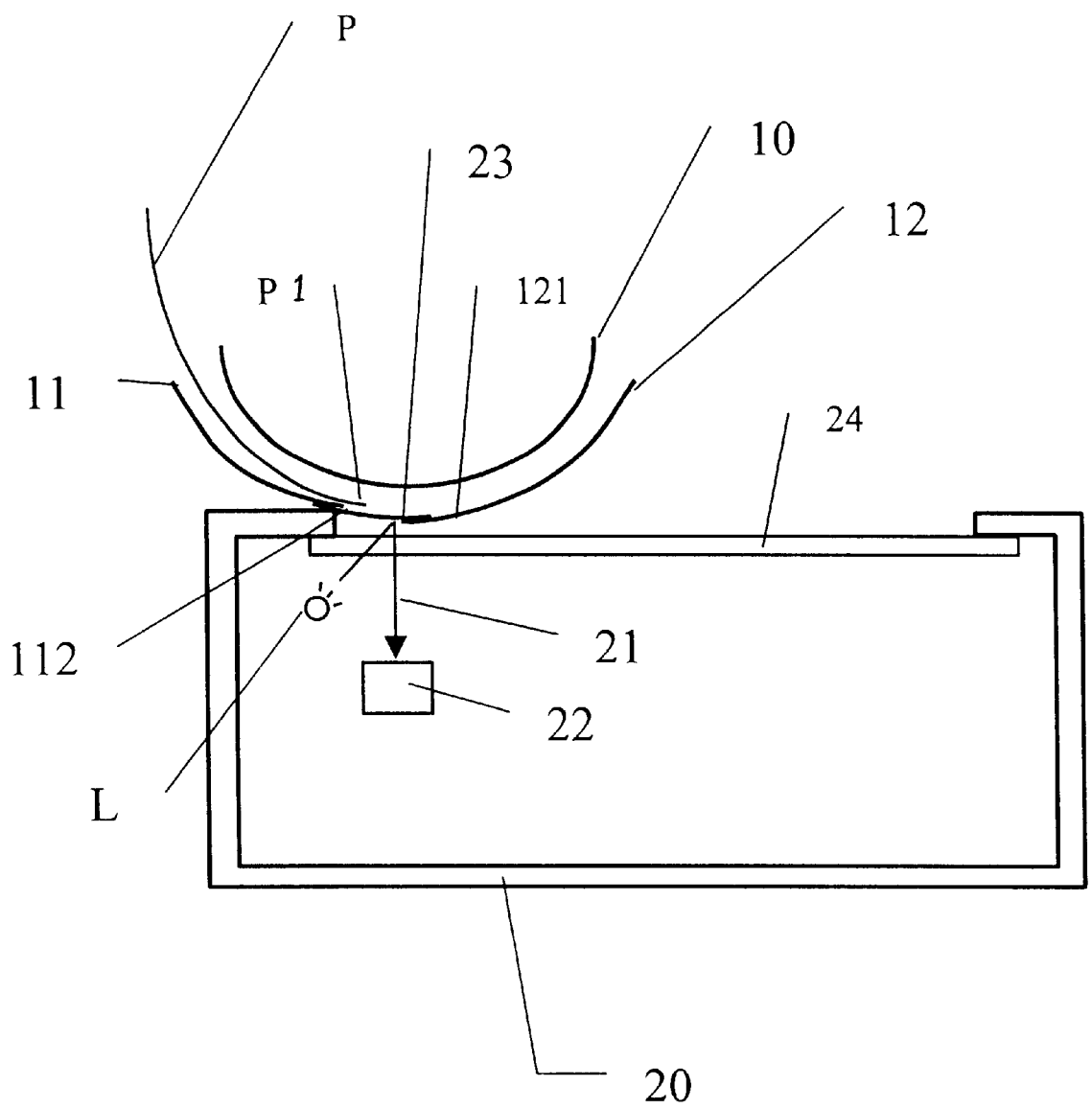
FIG. 1 shows the structure of a scanner with a prior paper guide.
Figure 2:
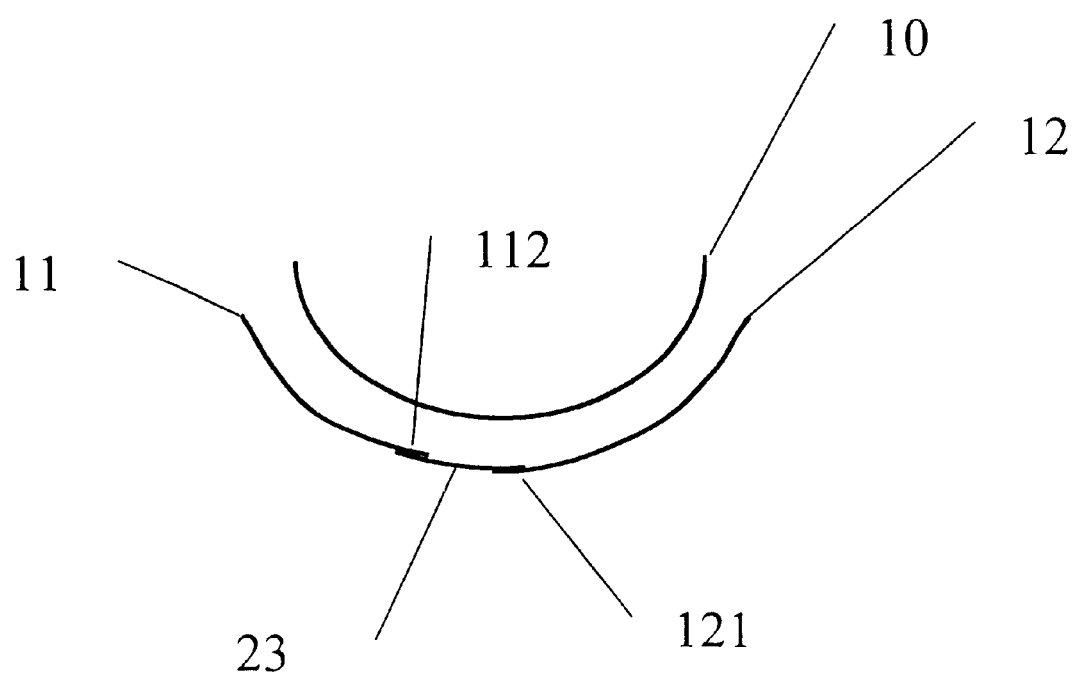
FIG. 2 shows the prior art paper guide.
Figure 3:
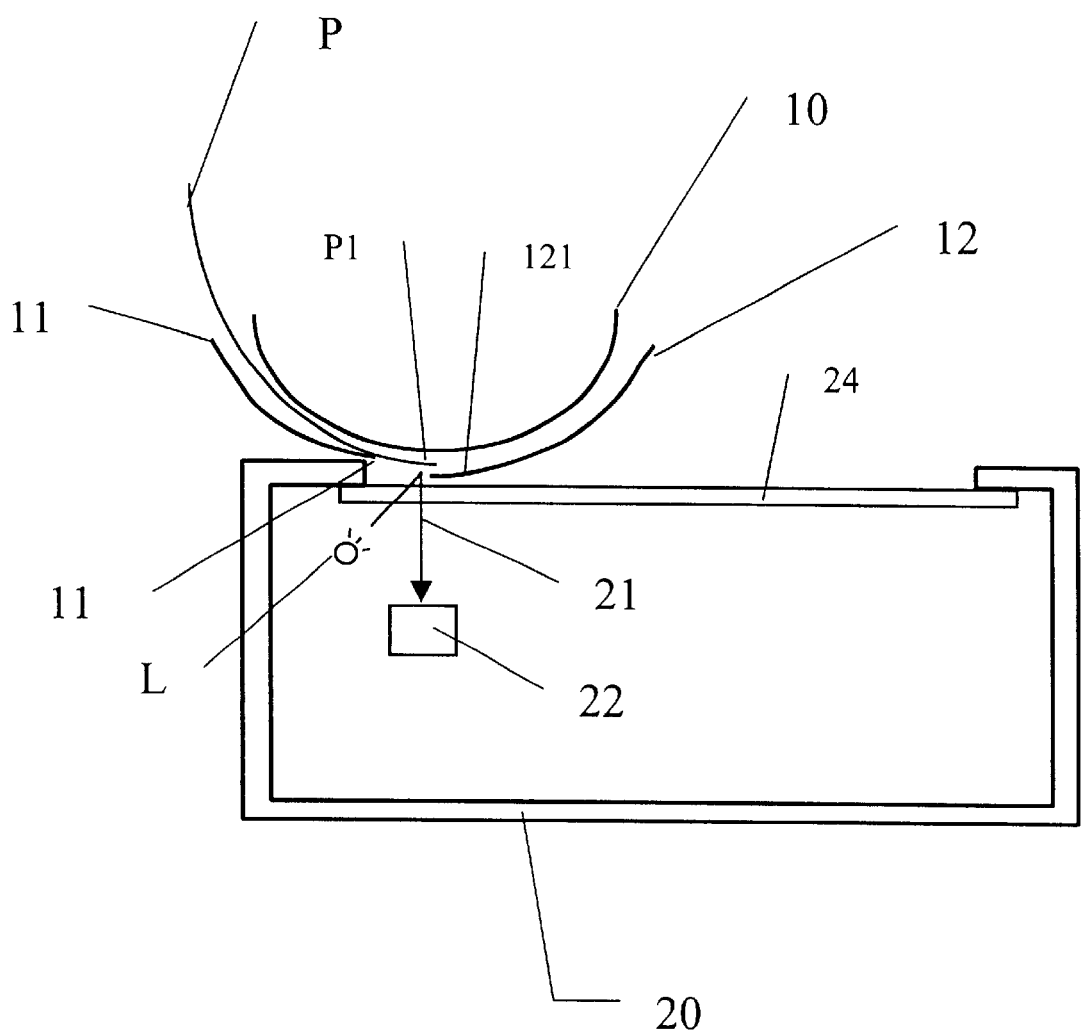
FIG. 3 shows the structure of a scanner using the paper guide of the present invention.

FIG. 3 shows the structure of the present invention. The paper guide is mounted over the scan window 24 of the scanner frame 20. The paper guide has an upper guide 10, an inlet lower guide 11, and an outlet lower guide 12 to form a conduit for the paper. The lower guide 11 is separated from and overhangs over the lower guide 12. When a document P is fed past the gap between the two lower guides 11 and 12, the light ray from the light source L is incident on the document P. The reflected light ray 21 sensitizes an image sensor 22 for further signal processing.

Figure 4:
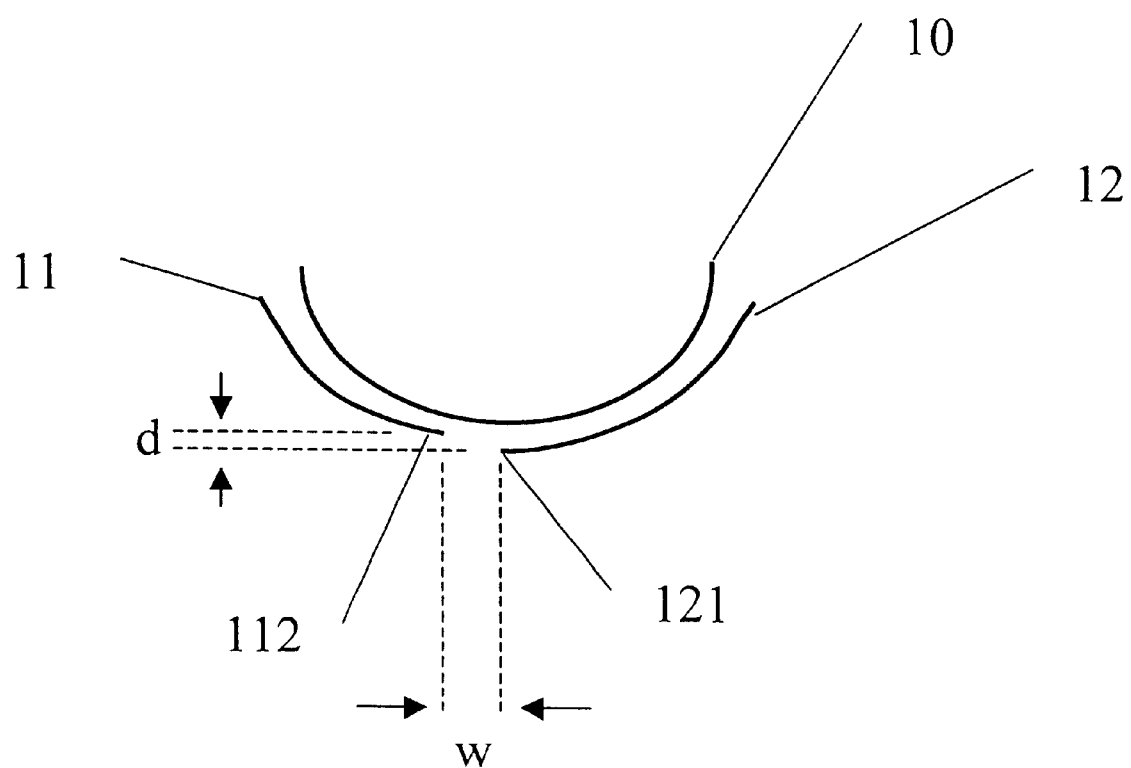
FIG. 4 shows the detailed structure of the paper guide of the present invention.

The detailed structure of the paper guide is shown in FIG. 4. Below the upper guide 10 are two paper guides: the inlet lower guide 11 and the outlet lower guide 12. That is, the lower guide only includes two parts. The inlet lower guide 11 is separated from the outlet lower guide 12 by a distance W, and overhangs over the outlet lower guide 12 by a height d. During scanning of the document, the scanning light is incident on the part of the paper which hangs from the inlet lower guide 11 over the outlet lower guide 12 in the gap W. Due to the stiffness of the paper, the incident point of the light from the source is in focus all the time. As compared with the prior art, the present invention does not require a transparent film between the two lower paper guides.

While the preferred embodiment of the invention has been described, it is apparent to those skilled in the art that various modifications may be made in the embodiment without departing from the spirit of the present invention. Such modifications are all within the scope of this invention.

What is claimed is:

1. A paper guide of a scanner for feeding a document over a scan window scanned by a light source, comprising:

an upper guide;

a paper outlet lower guide under said upper guide;

a paper inlet lower guide under said upper guide and overhanging over said paper outlet lower guide, wherein said upper guide, said outlet lower guide and said inlet power guide are concave downward; and a gap separating said paper outlet lower guide and said paper inlet lower guide in the direction of the movement of said document, and at which said document is exposed to a light source.

* * * * *